No. 608,346. Patented Aug. 2, 1898.
J. C. SHARP.
STUMP SPLITTING DEVICE.
(Application filed Sept. 7, 1897.)
(No Model.) 2 Sheets—Sheet 2.
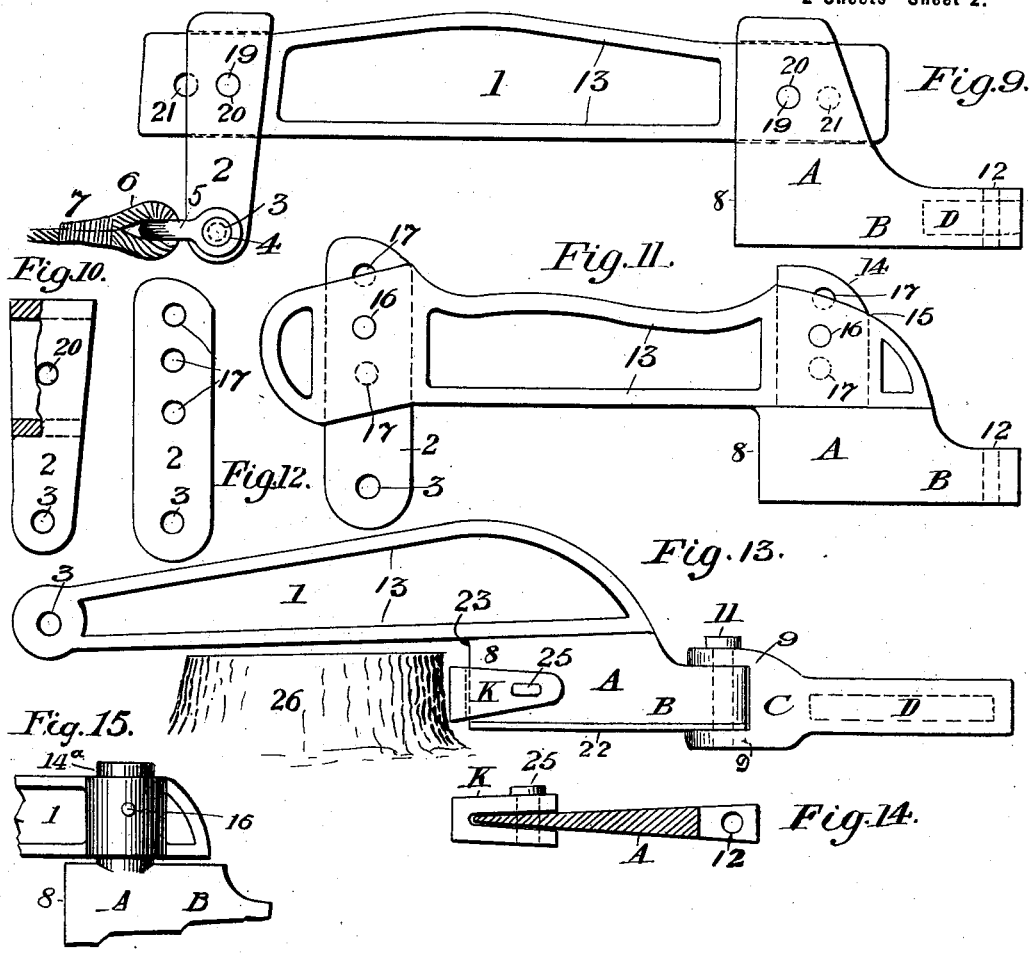
Witnesses:
Leslie G. Sharp
Walter C. Harris
Inventor:
John C. Sharp

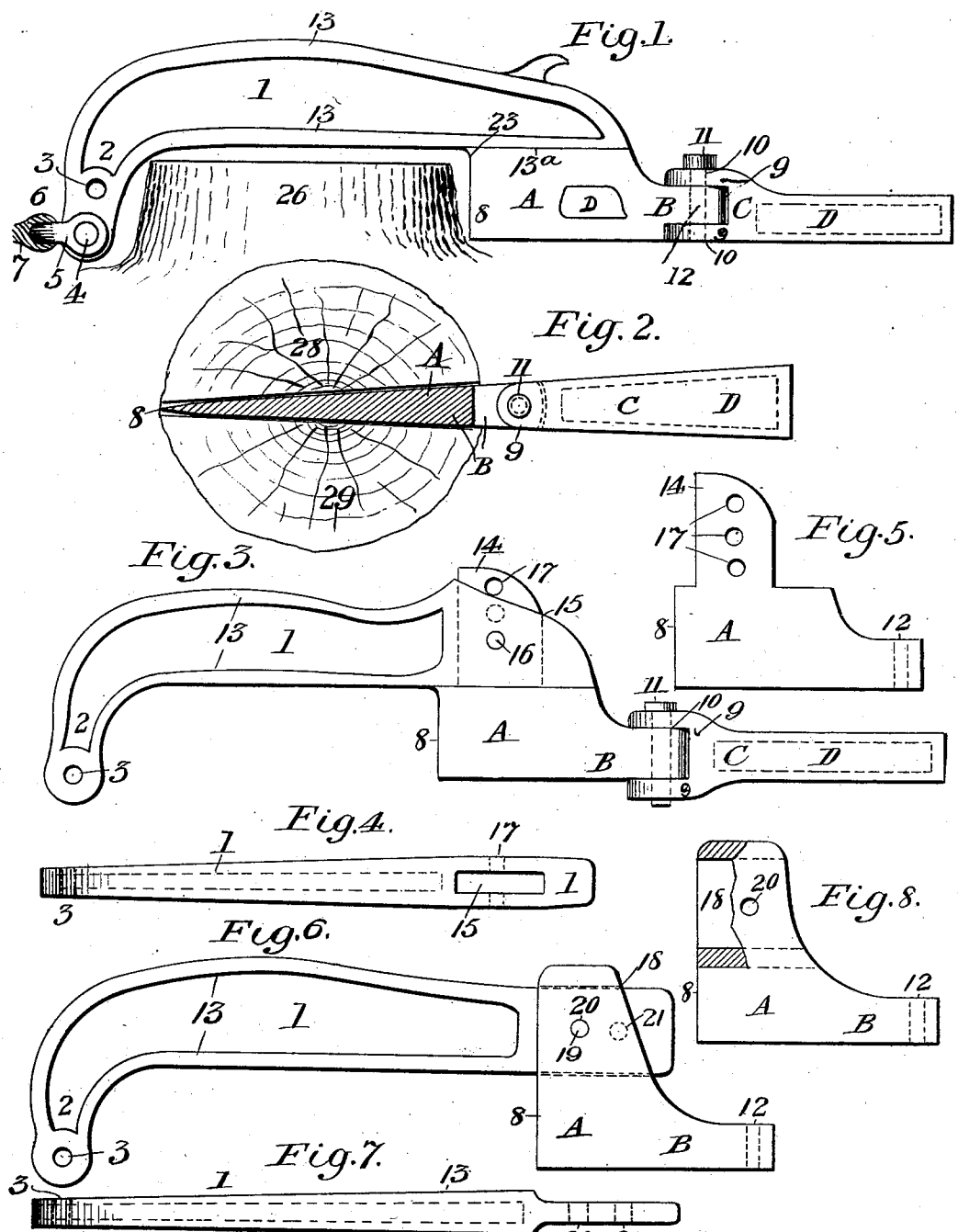

UNITED STATES PATENT OFFICE.

JOHN C. SHARP, OF DELAVAN, WISCONSIN.

STUMP-SPLITTING DEVICE.

SPECIFICATION forming part of Letters Patent No. 608,346, dated August 2, 1898.

Application filed September 7, 1897. Serial No. 650,861. (No model.)

*To all whom it may concern:*

Be it known that I, JOHN C. SHARP, a citizen of the United States of America, residing at Delavan, in the county of Walworth and State of Wisconsin, have invented certain new and useful Improvements in Stump-Splitting Devices, of which the following is a specification.

When large stumps with green roots are removed bodily with a stump-pulling machine, considerable earth is frequently raised with the roots, leaving a good-sized hole to fill up as well as the labor of removing the earth from the roots, and if the stump be large it is heavy and difficult to handle and dispose of it.

The object of my invention is to provide cheap and handy devices to be used in connection with a stump-pulling machine whereby its power may be utilized in splitting a stump into two or more pieces. Then with light power the pieces may be pulled out separately and be more easily handled. Furthermore, as in the process of splitting the stump will usually rise several inches, loosening the earth more or less from its roots, and being pulled out in pieces, less earth is therefore taken up and a smaller hole left to fill than if the stump were pulled out bodily, raising the entire mass of earth in and above its roots.

My invention consists of certain details hereinafter described and claimed.

In the accompanying drawings, illustrating my invention, in which similar numerals and letters of reference indicate like parts, Figure 1 is a side elevation of my stump-splitting device with its wedge part in two sections connected together, and the splitting device is in this view shown in position ready to be pulled through the stump 26. Fig. 2 is a plan view showing the wedge part of the device cut in horizontal section from the draft-bar, the latter part being removed to more clearly show the wedge part splitting the stump open. Fig. 3 is a side elevation of a modified form of my stump-splitting device, showing the wedge part in two sections and the front section detachably connected to the draft-bar. Fig. 4 shows a plan view of the draft-bar alone of the splitting device shown in Fig. 3; and Fig. 5 shows a side elevation of the wedge part, shown also in Fig. 3, but it is detached from the draft-bar in this view. Fig. 6 shows a side elevation of a modified form of my stump-splitting device, its draft-bar alone being shown in plan view in Fig. 7 and its wedge part in side elevation and broken section in Fig. 8. Fig. 9 is a side elevation of a modified form of my stump-splitting device, the downwardly-projecting part at the front end being shown as detachably connected to the draft-bar, and is shown in side elevation detached and in broken section in Fig. 10. Fig. 11 is a side elevation of a modified form of my stump-splitting device, showing the downwardly-projecting part detachably connected to the front part of the draft-bar, said downwardly-projecting part being shown in side elevation and detached from the draft-bar in Fig. 12. Fig. 13 is a side elevation of a modified form of my stump-splitting device, showing the wedge part in two sections detachably connected and also showing the lateral flange on the wedge. Fig. 14 is a plan view of my wedge shield or stop, showing how it is applied to the wedge, the wedge being shown as cut in horizontal section below the draft-bar. A side elevation of said wedge shield or stop as applied to the wedge is also shown in Fig. 13. Fig. 15 is a view of a broken section of the draft-bar of my stump-splitting device with a detachable wedge part shown in broken section, also showing the tongue part 14ª made in cylindrical form and fitting into a vertical round opening in the draft-bar.

My stump-splitting device may be made of any strong and suitable metal and preferably of a metal that can be cast.

The approximately horizontal draft-bar 1 is preferably made with a downwardly-projecting part 2 at its front, with one or more holes 3 to receive the pin 4 of a clevis 5 for connecting the draft-bar to an eye or link 6 on a draft-rope 7. At the rear end of the draft-bar 1 is another downwardly-projecting part A, with a wedge-point 8. The wedge part tapers from rear to front and may be made in two sections B and C, and on one of the sections two jaws 9 may be made with holes 10 to receive a vertical pin 11, which pin also passes through a vertical hole 12 in the other wedge-section. There are other simple ways in which the wedge-sections may be detachably connected together that I may use when occasion requires. The object in making the wedge part in sections is to render the handling lighter, and if the first or front section of the wedge B splits the stump open widely enough the rear section C may not be attached or used, and in some cases after the stump has been split some I may pass the draft-cable through the split opening and attach it between the jaws 9 to the pin 11 and pull the wedge-section C alone directly through the stump, so as to split it open more widely. The wedge part may in places be cast hollow or have openings D to remove unnecessary stock and reduce the weight.

Around the outer part of the draft-bar and also the downwardly-projecting part at its front I preferably cast a lateral rib 13 to strengthen and stiffen the parts and extend the lower part of said rib 13 rearwardly above the wedge part, so as to well stiffen the rear part of the draft-bar and strongly connect the wedge part thereto. The object in having the front part of the draft-bar bent or turned downwardly is to provide for a hitching-point for the draft-cable approximately on the same horizontal plane as the lower part of the wedge or below it even in some cases, so that there is no tendency of the wedge to rise and run out of the top of the stump before it has passed entirely through, and with the front part of the draft-bar thus bent or projecting downwardly there is not the tendency to pry the wedge part up higher than would be desired, as would often be the case if the draft-bar were made straight and the top of the stump then serving as a fulcrum for such a pry. It will be readily seen that thus bending or turning downwardly the front of the draft-bar is a very valuable and important feature of my invention, as the wedge must then go through the stump on the same plane as that on which the hitching-point of the draft-cable moves.

In some cases I make the wedge part separate, connecting it with the draft-bar by means of a tongue part 14 sliding into a vertical opening 15, made in the draft-bar to receive it, and may be held in place by a cross-pin 16 passing through holes 17 in the tongue and also in the sides of the opening 15. This arrangement of the parts provides for lighter handling, for raising or lowering the wedge part when desired, and also permits the use with the draft-bar of wedge parts made of different thicknesses. I in some instances also make the wedge part separate from the draft-bar, providing an opening 18 to receive the draft-bar, and the cross-pin 19 may be used through the holes 20 and 21 in the wedge part and draft-bar, thus permitting the wedge part to be slid along the draft-bar and held at the various points when desired. The downwardly-projecting part 2 may also be detachably and adjustably connected to the draft-bar by means of an opening made either in said downwardly-projecting part 2 or in the draft-bar and a cross-pin used, as hereinbefore described, for detachably connecting the wedge part and draft-bar. For small stumps I sometimes use a splitting device, Fig. 13, without the front part of the draft-bar being bent or turned down.

The lateral flange 22, Fig. 13, is sometimes made on the wedge part to strengthen and stiffen it, and said flange also has a tendency to prevent the wedge part from rising when being pulled through the stump.

The wedge part should be made quite long, tapering very gradually, so as to not require too much power to pull it through the stump, and should be made wide enough at its rear end to split the stump open deeply enough in the ground so that the sections may easily separate when being pulled. The point of the wedge is preferably made straight up and down or at right angles to the horizontal draft-bar. In some cases I cast a fillet 23 in the corner, as shown, to strongly tie the draft-bar and its rear downwardly-projecting part together.

If for pulling the splitter through a stump I use a stump-pulling machine such as is anchored to a stump and swings laterally on the ground into its proper draft-line during such adjusting, the changing draft would be liable to exert a lateral or foul strain on the wedge-point and perhaps cause it to bend or break. So in order to have the machine in its proper draft-line before the wedge is made to enter the stump I provide a shield or stop K, which I attach to the wedge in any simple and suitable manner or by means of a cross-pin 25 passing through holes in the sides of the shield and a hole in the wedge, as shown in Figs. 14 and 13. The blunt face of the stop or shield bearing against but not going into the stump causes the machine to swing into proper draft-line, and then the shield or stop may be removed and the wedge pulled through the stump. When the stump has been split into sections, the draft-cable of the stump-pulling machine is attached to them and they are pulled out.

While I have shown and described the preferred form of my stump-splitting and stump-removing devices, I do not wish to be limited thereto, as many modifications could be made without departing from the spirit of my invention.

What I claim as my invention is—

1. In a stump-splitting device, the combination of a horizontal draft-bar with a downwardly-projecting part with a wedge-point on it, and a part of said wedge projecting rearwardly from said downwardly-projecting part of said draft-bar, and said wedge adapted to pull through and split open a stump when suitable power is applied to said draft-bar, all substantially as shown and described and for the purpose set forth.

2. In a stump-splitting device, the combination of a horizontal draft-bar with a downwardly-projecting part with a wedge-point on it, a laterally-projecting flange on the wedge part to strengthen said wedge and aid in holding it down when being pulled through a stump, and said wedge adapted to split the stump open, all substantially as shown and described and for the purpose set forth.

3. In a stump-splitting device, the combination of a horizontal draft-bar with a downwardly-projecting part with a wedge-point on it, and a part of said wedge projecting rearwardly from said downwardly-projecting part of said draft-bar, said wedge made in two sections detachably connected, and said wedge adapted to pull through and split open a stump when suitable power is applied to the front end of said draft-bar, all substantially as shown and described and for the purpose set forth.

4. In a stump-splitting device, the combination of a horizontal draft-bar with a downwardly-projecting part with a wedge-point on it, and a part of said wedge projecting rearwardly from said downwardly-projecting part of said draft-bar, said wedge made hollow or with an opening in it to render it lighter than if made in solid form, and said wedge adapted to pull through and split open a stump when suitable power is applied to the front end of said draft-bar, all substantially as shown and described and for the purpose set forth.

5. In a stump-splitting device, the combination of a horizontal draft-bar with a downwardly-projecting part with a wedge-point on it and a part of said wedge projecting rearwardly from said downwardly-projecting part of said draft-bar, said wedge made in two sections detachably connected, and one of said sections made hollow or with an opening in it to render it lighter to handle than if made in solid form, and said wedge adapted to pull through and split open a stump when suitable power is applied to the front end of said draft-bar, all substantially as shown and described and for the purpose set forth.

6. In a stump-splitting device, the combination of a horizontal draft-bar with a wedge part detachably connected thereto by means of a slidable joint, and said wedge adapted to pull through and split open a stump when suitable power is applied to the front end of said draft-bar, all substantially as shown and described and for the purpose set forth.

7. In a stump-splitting device, the combination of a horizontal draft-bar with a part projecting downwardly from its front, and means for connecting the lower end of said downwardly-projecting part to a draft-cable, and at the rear end of said draft-bar a part projecting downwardly therefrom with a wedge-point on it, and said wedge part adapted to pull through and split open a stump when suitable power is applied, all substantially as shown and described and for the purpose set forth.

8. In a stump-splitting device, the combination with a horizontal draft-bar of a part projecting downwardly from its front, and means for connecting the lower end of said downwardly-projecting part to a draft-cable, and at the other end of said draft-bar, a part projecting downwardly therefrom with a wedge-point on it, a part of said wedge projecting rearwardly from said latter downwardly-projecting part of the draft-bar, and said wedge adapted to pull through and split open a stump when suitable power is applied to the draft-bar all substantially as shown and described and for the purpose set forth.

9. In a stump-splitting device, the combination of a horizontal draft-bar with a part at its front projecting downwardly therefrom and means for connecting the lower end of said downwardly-projecting part to a draft-cable, and at the rear end of said draft-bar a part projecting downwardly therefrom and with a wedge-point on it, said wedge part projecting rearwardly from said latter downwardly-projecting part, and said wedge part made with an opening in it or hollowed out so as to lighten it, and said wedge adapted to pull through and split open a stump when suitable power is applied to said draft-bar all substantially as shown and described and for the purpose set forth.

10. In a stump-splitting device, the combination of a horizontal draft-bar with a part at its front projecting downwardly therefrom and means for connecting the lower end of said downwardly-projecting part to a draft-cable, and at the rear end of said draft-bar, a downwardly-projecting part with a wedge-point on it, said wedge made in two sections detachably connected, and said wedge adapted to pull through and split open a stump when suitable power is applied to said draft-bar, all substantially as shown and described and for the purpose set forth.

11. In a stump-splitting device, the combination of a horizontal draft-bar with a part at its front projecting downwardly therefrom and means for connecting its lower end to a draft-cable, said downwardly-projecting part detachably connected to said draft-bar by means of a slidable joint, and at the rear end of said draft-bar, a part projecting downwardly therefrom with a wedge-point on it, and said wedge adapted to pull through and split open a stump when suitable power is applied to said draft-bar, all substantially as shown and described and for the purpose set forth.

12. In a stump-splitting device, the combination of a horizontal draft-bar with a part projecting downwardly therefrom with a wedge-point on it, a stiffening-rib or thickened part 13$^a$, on said draft-bar above said wedge part, and said wedge adapted to pull through and split open a stump when suitable power is applied to the front end of said draft-bar, all substantially as shown and described and for the purpose set forth.

13. In a stump-splitting device, the combination of a horizontal draft-bar with a part projecting downwardly from the rear end of said draft-bar with a wedge-point on it, a stiffening-rib or thickened part 13$^a$, on said draft-bar above said wedge part, a part projecting downwardly from the front of said draft-bar, means for connecting said latter downwardly-projecting part of said draft-bar to a draft-cable, and said wedge part adapted to pull through and split open a stump when suitable power is applied to said draft-bar, all substantially as shown and described and for the purpose set forth.

14. In a device to aid in the removal of stumps, the combination of a horizontal draft-bar with a part projecting downwardly from its front end, an eye or means on the lower end of said downwardly-projecting part for connecting the draft-cable of a stump-extracting machine thereto, a part projecting downwardly from the rear end of said horizontal draft-bar, with a point made on the lower end of said latter downwardly-projecting part, and of a stop or suitable means on said point to prevent it from pulling through the stump, when so desired, substantially as and for the purpose set forth.

15. In a stump-splitting device, the combination of a horizontal draft-bar with a part projecting downwardly from the front end thereof, and means for connecting the lower end of said downwardly-projecting part to a draft-cable, a part projecting downwardly from the rear end of said horizontal draft-bar with a wedge part formed on the lower end of said latter downwardly-projecting part, and said downwardly-projecting part connected at its upper end both slidably and pivotally to said draft-bar, all substantially as, and for the purpose set forth.

JOHN C. SHARP.

Witnesses:
LESLIE G. SHARP,
WALTER C. HARRIS.